United States Patent [19]

Inaba et al.

[11] 4,409,618
[45] * Oct. 11, 1983

[54] DIGITAL VIDEO EFFECTS SYSTEM EMPLOYING A CHROMA-KEY TRACKING TECHNIQUE

[75] Inventors: Masao Inaba; Kazuo Kashigi, both of Tokyo, Japan

[73] Assignee: Nippon Electric Co., Ltd., Tokyo, Japan

[*] Notice: The portion of the term of this patent subsequent to Apr. 29, 1997 has been disclaimed.

[21] Appl. No.: 301,037

[22] Filed: Sep. 10, 1981

Related U.S. Application Data

[60] Continuation of Ser. No. 87,334, Oct. 23, 1979, abandoned, which is a division of Ser. No. 922,634, Jul. 7, 1978, Pat. No. 4,200,890.

[30] Foreign Application Priority Data

Jul. 11, 1977 [JP] Japan .................................. 52-83285
Jul. 11, 1977 [JP] Japan .................................. 52-83286

[51] Int. Cl.$^3$ ........................ H04N 5/22; H04N 9/535
[52] U.S. Cl. ........................................ 358/183; 358/22
[58] Field of Search ........................ 358/182, 183, 22

[56] References Cited

U.S. PATENT DOCUMENTS 3,437,873  4/1969  Eggert ........................... 358/183 X
3,654,386  4/1972  Baum ............................. 358/183 X
3,787,619  1/1974  Wolff ............................. 358/183 X
4,028,727  6/1977  Skrydstrup .................... 358/183 X
4,063,280  12/1977 Hattotori et al. ..................... 358/22
4,103,830  12/1978 Derickson ............................ 358/22
4,200,890  4/1980  Inaba et al. ......................... 358/183

*Primary Examiner*—Aristotelis M. Psitos
*Attorney, Agent, or Firm*—Hopgood, Calimafde, Kalil, Blaustein & Judlowe

[57] ABSTRACT

A tracking system for producing special effects in a television picture by inserting a second television picture into a first television picture. The first and second pictures are represented by first and second video signals. A key signal representing a key frame to be positioned on the first picture is produced and the electrical noise is removed from the key signal. A position signal having two horizontal position signal values and two vertical position signal values is produced and represents the position of a circumscribed frame of the key frame. A compressed second video signal representing a compressed second picture is produced in response to the second video signal and the position signals. The horizontal and vertical position signals produce a frame signal, and the frame signal is applied to the noise removing circuitry. In response to the key signal the first video signal and the second video signal are combined to produce the special effects.

3 Claims, 16 Drawing Figures

DIGITAL VIDEO EFFECTS SYSTEM EMPLOYING A CHROMA-KEY TRACKING TECHNIQUE

This is a continuation of Ser. No. 87,334 filed Oct. 23, 1979 to be abandoned, which is a divisional of Ser. No. 922,634 filed July 7, 1978 now U.S. Pat. No. 4,200,890.

This invention relates to digital video effects systems, and more particularly to chroma-key tracking systems for purely electronically compressing and moving a television picture to dimensions and a position specified by a chroma-key screen in another picture and for inserting the compressed picture into an area corresponding to the chroma-key screen.

The so-called keyed insertion technique by which a part of one television picture is inserted into another picture to produce a special effect is frequently used in television broadcasting. One example of such technique is the croma-key insertion by which a part of a first picture is designated by a chroma-key signal produced from picture and the designated part is inserted into the second picture. However, since a chroma-key signal undergoes the change in position and dimension with the movement of the television camera employed for the pickup of the second picture, the shooting angle of the camera must be changed accordingly. This involved serious difficulty. To eliminate it, a method has been proposed, in which the picture to be inserted is compressed in accordance with the chroma-key signal (Japanese Patent Publication No. 53-9896 referred to). By this technique, the position and dimensions are determined by comparing the chroma-key signal with a standard television frame.

Referring to FIG. 1, it is assumed that picture B is compressed into the size of a chroma-key signal C to produce a picture D and that the picture D is inserted into a piston A to produce a picture E. In this instance, the chroma-key signal C serves as the standard signal to designate into what position and what dimensions picture D should be compressed. Generally, the chroma-key signal C is produced by mixing in appropriate proportions the blue component as main constituent, out of the various chromatic components (the red, green and blue components) constituting the picture A, with the two other components. It is therefore customary, when a chroma-key signal to be produced, to compose the picture A by leaving blue that part of the picture marked with hatching.

In the temporal relationship between a chroma-key signal and the compressed picture corresponding to it, the latter tends to delay as will be explained below. Accordingly, when a chroma-key signal moves, an inconvenience may arise from the inability of the chroma-key signal.

Thus, FIG. 2A shows an output picture in a normal state and FIG. 2B, another output picture immediately after the movement of the chroma-key signal towards the right side of the frame. Since the compressed picture to be inserted into the chroma-key frame moves with a time lag, it is unable to change rapidly enough, resulting in such an unnecessary part as is represented by hatching in FIG. 2B.

Moreover, since brighter or white parts of the object involve much of the blue component, noises occur in addition to the desired key signal in many actual instances, as illustrated in FIG. 2C. If the picture is compressed in accordance with such a chroma-key signal, it will be compressed into a picture of a size including the noise component as well (the size represented by dotted lines in FIG. 2C) and look like FIG. 2D. The insertion of such picture D into the picture C would result in a picture as shown in FIG. 2E, which is undesirable because of the failure of the inserted picture to be fully contained in the designated chroma-key frame. If the noise disappears, the picture will return to the state illustrated in FIG. 1E, but noise components usually intermittently appear, resulting in alternating output pictures, which are very unpleasant to look at.

An object of the present invention is therefore to provide a chroma-key tracking system which, even when the chroma-key frame shifts in position, prevents from any unnecessary part from being generated.

Another object of this invention is to provide a chroma-key tracking system which is capable of correctly extracting the chroma-key frame even when the video signal on which the chroma-key signal is based has a component which cannot be readily distinguished from the chroma-key signal.

According to this invention, there is provided a tracking system for producing a special effect on a television picture by inserting into a key frame positioned on a first picture relating to a first video signal a second picture relating to a second video signal which is compressed in accordance with said key frame, said system comprising:

means for producing a key signal representing said key frame;

means responsive to said key signal for producing a position signal representing a position of a circumscribed frame of said key frame;

means responsive to said position signal for producing an imaginary-frame position signal representing an imaginary frame greater than said key frame;

means responsive to said second video signal and said imaginary-frame position signal for producing a compressed second video signal representing a compressed second picture, said compressed second picture being identical to said imaginary frame in size; and means for selectively gating said first video signal and said compressed second video signal in response to said key signal, whereby said special effect is obtained in which said compressed second picture is inserted into said chroma-key frame on said first picture.

The features and advantages of this invention will be understood from the detailed description of a preferred embodiment thereof, taken in conjunction with the accompanying drawings, wherein.

Figure 3:
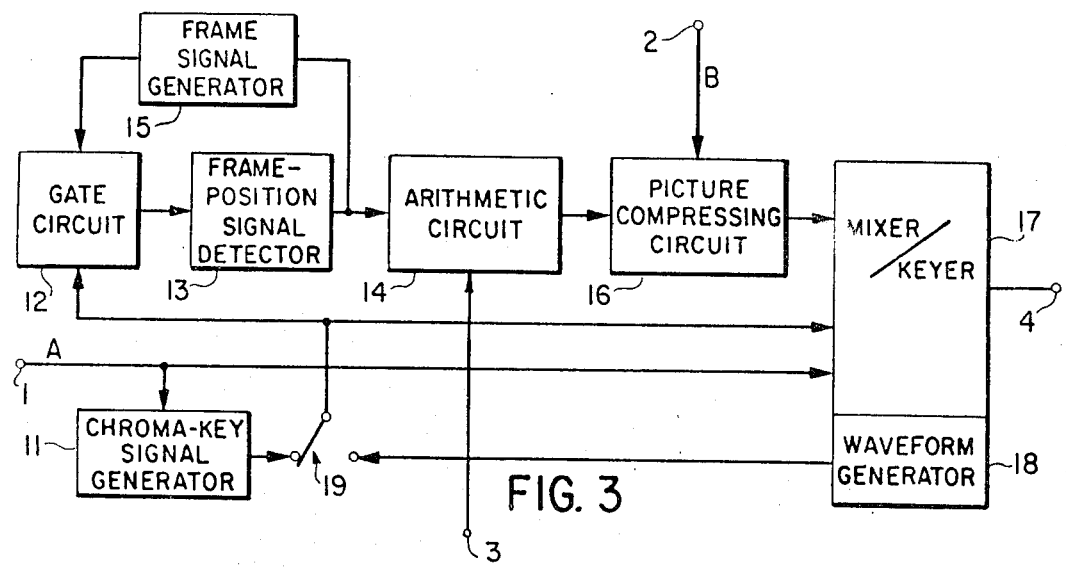
FIG. 3 is a block diagram of an embodiment of this invention.

With reference to FIG. 3 showing an embodiment of this invention, a first video signal A is supplied to a first input terminal 1, a second video signal B to a second input terminal 2 and a control signal to a third input terminal 3. A chroma-key signal generator 11 generates, in response to the first video signal from the first input terminal 1, a chroma-key signal. The chroma-key signal is supplied to a gate circuit 12 via a switch 19, and gated by the output of a circumscribed frame signal generator 15 to be deprived of its noise component. The output of the gate circuit 12 is supplied to a frame-position signal detecting circuit 13 for detecting four values, i.e., those of the leftmost and rightmost points in the horizontal direction and the uppermost and lowermost points in the vertical direction of the chroma-key signal.

Figure 4:
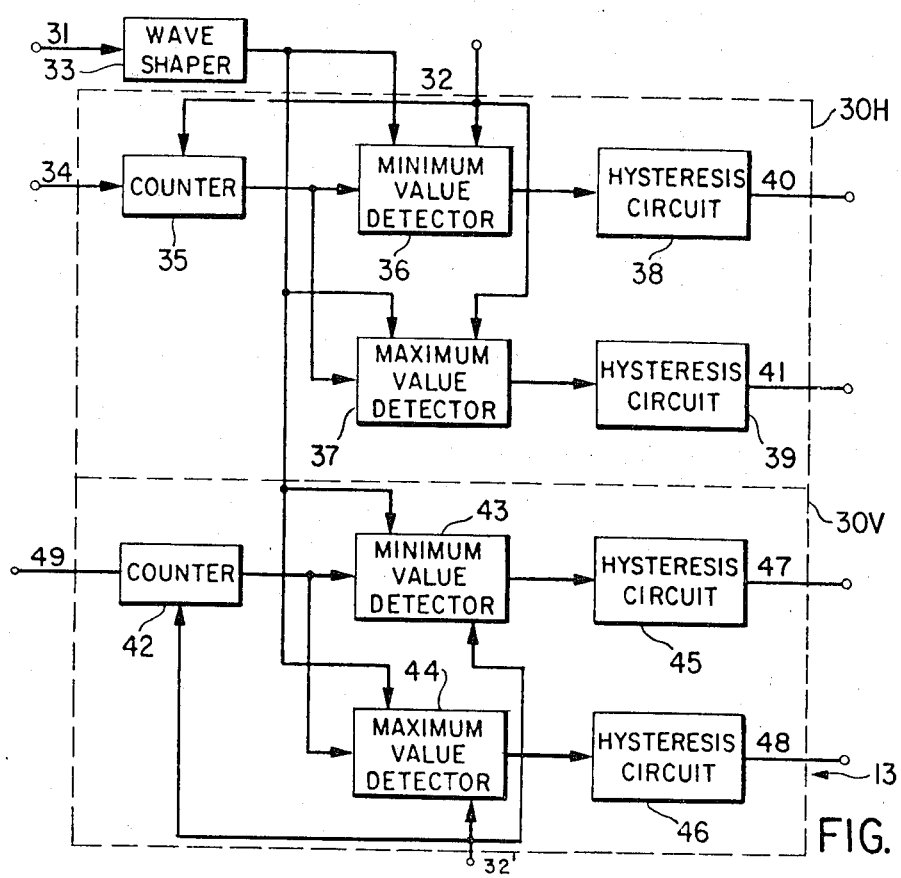
FIG. 4 is a block diagram of the frame-position signal detecting circuit used in the embodiment shown in FIG. 3.

One example of the frame position signal detecting circuit 13 is illustrated in FIG. 4. A chroma-key signal 31, whose noise component has been removed by the gate circuit 12, is shaped by a wave shaper 33, and fed to horizontal and vertical position detectors, 30H and 30V.

In the horizontal position detector 30H, a counter 35, so composed as to be driven by clock pulses 34 to advance by one per clock pulse, is cleared to zero by a pulse 32 for each horizontal scanning period of a television signal. The counter 35 feeds the counted values to a minimum-value detector 36 and a maximum-value detector 37. The minimum-value detector 36 detects the counted value of the counter 35 as the minimum horizontal value at the leading edge of the chroma-key signal once every horizontal scanning period. The minimum horizontal value represents the leftmost position of the chroma-key signal in the horizontal direction. The maximum-value detector 37 holds the counted value of the counter 35 at the trailing edge of the chroma-key signal to detect the last-held value in each horizontal scanning period. The detected value is the maximum horizontal value representing the rightmost position of the chroma-key signal in the horizontal direction. The detectors 36 and 37 are reset by the clear pulse 32.

The detected minimum and maximum horizontal values are supplied to hysteresis circuits 38 and 39, respectively, which are for removing the jitters present at the rising and trailing edges of the chroma-key signal. A chroma-key signal, even if the original picture from which it is made is motionless, usually is susceptible to some jitters at its leading and tailing edges. Accordingly, the outputs of the maximum-value detector 36 and the minimum-value detector 37 are constantly fluctuating in minute degree. The hysteresis circuits 38 and 39, so composed that their outputs may not vary even if their inputs minutely fluctuate, greatly contribute to stabilization of the functioning of the system. The stabilized outputs 40 and 41 are fed to an arithmetic circuit 14.

In the vertical position detector 30V, a counter 42, so composed as to be driven by the horizontal synchronizing pulse 49 to advance by one per horizontal period, is reset to zero by a clear pulse 32' for each television field. The vertical position detector 30V functions in substantially the same manner as the horizontal position detector 30H except for the period of operation. A minimum-value detector 43 detects a minimum vertical value representing the uppermost position of the chroma-key signal. A maximum-value detector 44 detects a maximum vertical value representing the lowermost position of the chroma-key signal. The detected minimum and maximum vertical values are supplied to hysteresis circuits 47 and 48, respectively to remove jitters.

The stabilized outputs 47 and 48 are supplied to the arithmetic circuit 14.

Figure 5:
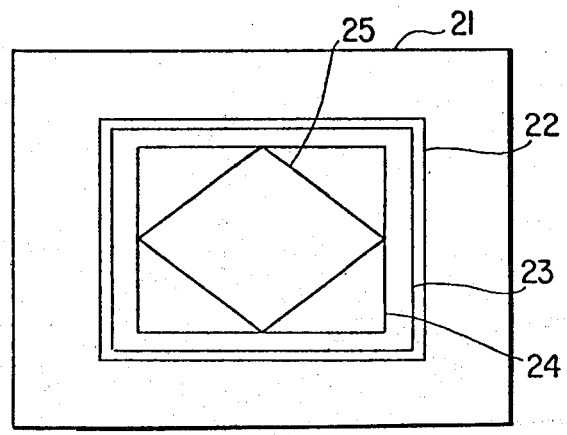
FIG. 5 illustrates the relationships on the full picture among various frames obtained by one embodiment of this invention.

The four values obtained from the circumscribed frame signal detector 13 represent the dimensions and position of the quadrilateral circumscribing around the chroma-key signal. Thus in FIG. 5, a reference numeral 21 indicates the dimensions of the standard picture, 25 shows the chroma-key frame and the four detected values correspond to the points of the four corners of the circumscribed frame 24. These four values are fed to the arithmetic circuit 14 and so corrected as to enlarge the dimensions of the frame. In FIG. 5, reference numerals 22 and 23 show two frames i.e., imaginary frames corresponding to the corrected four values.

Figure 6:
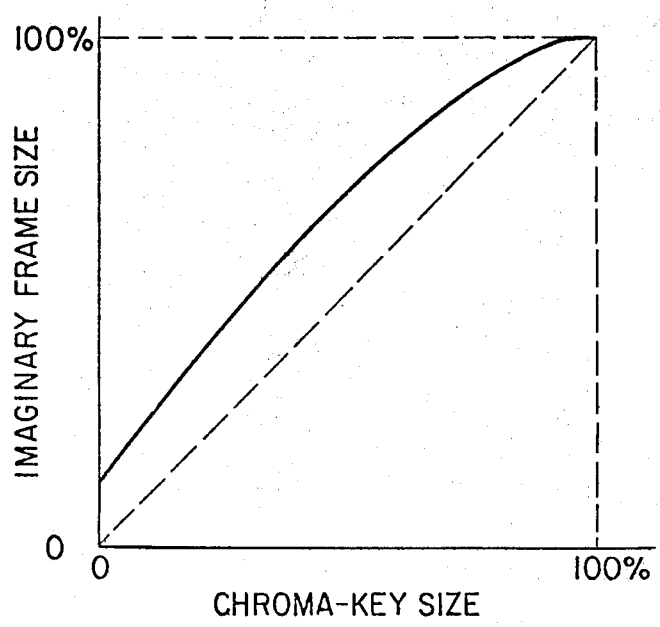
FIG. 6 shows the dimensional relationship between a chroma-key frame and an imaginary-frame.

One example of the dimensional relationship between the circumscribed frame 24 and the imaginary frame 22 or 23 is illustrated in FIG. 6. In FIG. 6, the axis of abscissas represents the size of the circumscribed frame 24 (hereinafter called the chroma-key size) based on the input chroma-key frame 25 and the axis of ordinates, the size of the imaginary frame 22 or 23. The increment in frame size and the chroma-key size are based on the following fact: Even if the chroma-key size is minimal, the increment is not zero but has a certain value. While this value is preferably small to minimize the part to be cut off by a key signal when a compressed picture is inserted into another by means of a chroma-key signal, it must be greater than a certain level in view of the possibility of the key signal to shift. The value should therefore be made controllable from outside. Next, it is so provided that the increment should decrease when the chroma-key size is close to the maximum size and that the sum of the chroma-key size and increment in no case should exceed the maximum size, because the rate of compression is never greater than one. It is further so provided that the increment reach its maximum when the chroma-key size is at its median, because in the usual state of use the signal most frequently is and moves to the greatest extent in its median size. Whereas the relationship between the chroma-key size and the increment is determined on the basis of the above-explained fact, it goes without saying that functioning is also possible even if the increment is made simply constant, proportioned to the chroma-key size of set in a relationship combining both.

Figure 7:
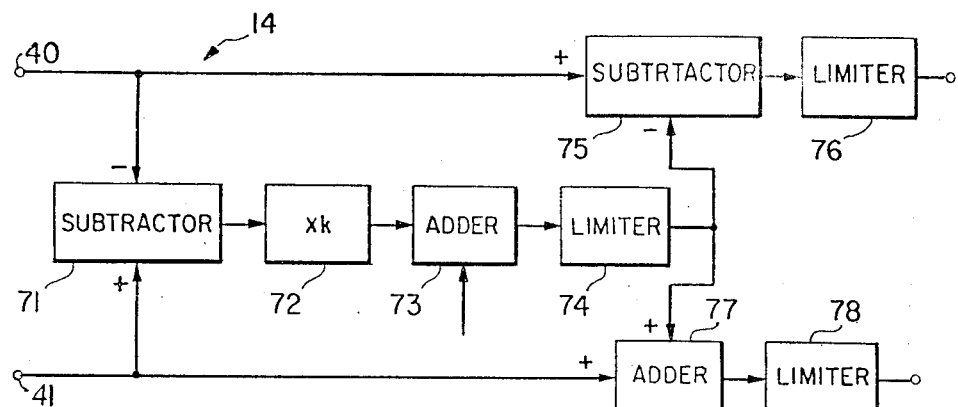
FIG. 7 is a block diagram of the arithmetic circuit employed in the embodiment shown in FIG. 3.

One example of the arithmetic circuit 14 will be described below with reference to FIG. 7. Since the underlying operation is common to both the horizontal and vertical directions, an example of the horizontal direction is given. The minimum value 40 and the maximum value 41 in the horizontal direction from the position detector 13 are supplied to the arithmetic circuit 14. In a subtraction circuit 71 is subtracted the minimum value from the maximum. The output of the subtraction circuit 71 thus represents the length of the circumscribed frame 24 in the horizontal direction. This value then becomes the input to the coefficient unit 72, and is multiplied by a certain coefficient to let the increment of the frame size include the proportional component of the chroma-key size. Next, a certain constant is added by the adder 73. Then, this output is led to a limiter 74 to be restricted from exceeding a certain value, so that the frame increment can be prevented from becoming too great when the chroma-key size is large. The output of the limiter 74 is led to a subtractor 75, and subtracted from the minimum value 40. The remainder of subtraction is led to a minimum value limiter 76. The minimum value limiter 76 is so composed as to replace a negative input with zero and let a positive input as it is.

Meanwhile, the output of the limiter 74 is also led to an adder 77 to be added to the maximum value 41. The sum is led to a maximum value limiter 78, which is so composed as to replace an input value exceeding the maximum conceivable value for a key signal with such maximum or allow to pass therethrough intact an input value not exceeding such maximum.

Since, the minimum value 40 is operated as stated above, to become smaller and the maximum value 41, to become greater, the chroma-key signal frame size is corrected to become equivalently greater.

Explanation of the vertical direction will be omitted here, because it is achieved in exactly the same manner as that in the horizontal direction described above.

The four corrected values are fed to the frame signal generator 15 (FIG. 3) to generate a frame signal corresponding to the frame 22 (FIG. 5). This frame signal is supplied to the gate circuit 12 to gate the chroma-key signal to remove the noise component. The noise component outside the frame 22 is thus eliminated.

Figure 1A:
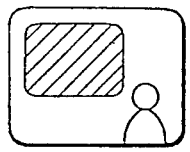
FIGS. 1A to 1E and 2A to 2E show television pictures relating to video signals produced by a conventional system.
Figure 1B:
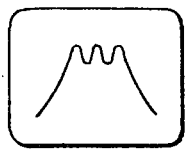
Figure 1C:
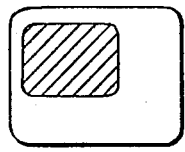
Figure 1D:
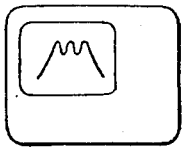
Figure 1E:
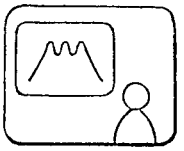
Figure 2A:
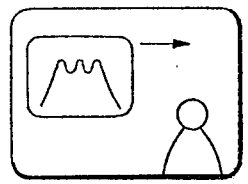
Figure 2B:
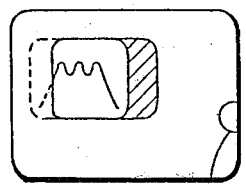
Figure 2C:
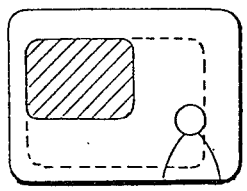
Figure 2D:
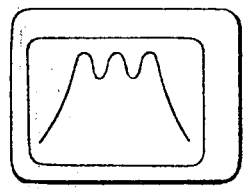
Figure 2E:
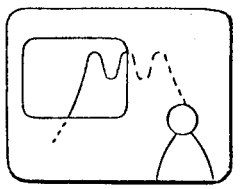

The arithmetic circuit 14, meanwhile, supplies the picture compressing circuit 16 with various values needed for compressing a second video signal to a size corresponding to the frame 23. The output of the compressing circuit 16 is supplied to the mixer-keyer 17 as one of its inputs. The mixer-keyer 17 are also supplied with the first video signal A and the chroma-key signal, so that the compressed second video signal B be inserted into and keyed with the first video signal A to give the required output signal 4. The size of the picture compressed by the compressing circuit 16 corresponds to the frame 23, and is greater than the circumscribed frame 25, because the second video signal B is deliberately compressed to a greater size than the actual key signal to prevent the emergence, as described above, of the unnecessary part, represented by hatching in FIG. 2B, in the output signal as a result of the gap between the movement of the chroma-key signal and that of the compressed picture owing to a delay in the processing of the signal when the picture is compressed.

Figure 8:
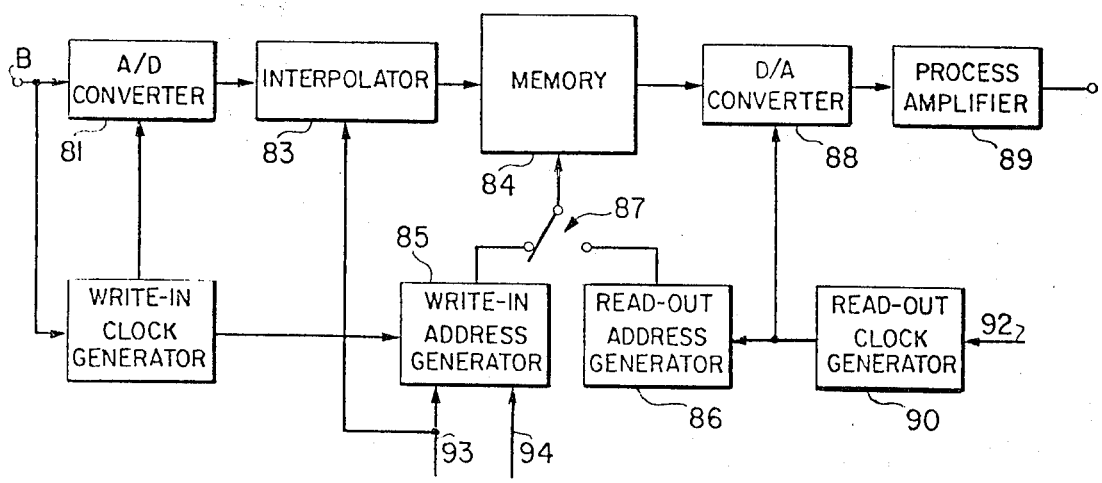
FIG. 8 is a block diagram of the picture compressing circuit employed in the embodiment shown in FIG. 3.

FIG. 8 is a schematic diagram of the picture compressing circuit 16, in which the second video signal B from the input terminal 3 is supplied to the analogue/digital converter 81 and converted into a PCM (pulse code modulation) signal. At the same time, the signal B is also supplied to the write-in clock generator 82 to generate a continuous wave phase-locked to the color burst signal. This continuous wave is multiplied, sent out as clock pulse for the analogue/digital converter 81. The output PCM signal from the analogue/digital converter 81 is supplied to the interpolating circuit 83.

The interpolating circuit 83 has a function to alter the number of picture elements in the horizontal direction and that of scanning lines in the vertical direction. When, for instance, a picture is to be compressed in a ratio of 1/1.5 in the horizontal direction, the circuit 83 allows the first of the series of input picture element to pass therethrough as it is, creates by interpolation between the second and third a picture element corresponding to exactly the middle of the two to deliver it as the second of the output picture elements, and allows the fourth picture element to pass therethrough as it is to constitute the third output picture element. By repeating this procedure, the number of output picture elements can be reduced to 1/1.5 of the number of input picture elements. This is equivalent to a 1.5-fold expansion of the sample gap in the analogue/digital converter. The output of the interpolating circuit 83 is written into the memory 84. Accordingly, the compressed picture is already written into the memory 84. These controls are effected by the signals of the outputs 93 and 94 from the arithmetic circuit 14. The signal 93 controls the gap between the picture elements newly created in the interpolating circuit 83, and the signal 94 controls the write-in address generator 85 which generates the address when a signal is written into the memory 84, in such a manner that the address value be increased by one every time a picture element arrives.

The readout address generator 86 generates the read-out address to be used when a signal is read out of the memory 84. The switch 87 is intended for selection of the write-in address when the signal is to be written in or of the read-out address when it is to be read out. The read-out clock generator 90, using the reference sync signal 92 as input, generates the read-out clock to drive the read-out address generator 86 and the digital-/analogue converter 88. The digital/analogue converter 88 converts the read out PCM signal from the memory 84 into an analogue signal. This analogue signal is fed to the process amplifier 89, amplified therein and turned out as the signal 91. This output signal, in the form of a picture signal compressed into a prescribed position and size, is supplied to the mixer-keyer 17 as one of its inputs.

As explained above, this system, with which it is possible to automatically compress an input picture into the size of a chroma-key signal supplied from outside, is very effective in the production of television programs. Although the chroma-key signal has been referred to in the above description as an example of the key signal, the principle of the present invention is of course directly applicable to the wipe key or the like from the wave generator 18. Especially, an unprecedented feature of this system is its stable functioning even when the key signal contains a noise.

What is claimed is:

1. A tracking system for producing special effects on a television picture, said television picture comprised of a first picture and a second picture inserted into said first picture, said first and second pictures being represented by first and second video signals respectively, said system comprising:

means for producing a key signal representing a key frame to be positioned on said first picture; means for removing electrical noise signals from said key signal to produce a noise-removed key signal; means responsive to said noise-removed key signal for producing a position signal representing a position of a circumscribed frame of said key frame, said position signal including two horizontal position signal values and two vertical position signal values; means for producing a compressed second video signal representing a compressed second picture in response to said second video signal and said position signal; means responsive to said two horizontal position signal values and two vertical position signal values for producing a frame signal, said frame signal being applied to said removing means; and means responsive to said key signal for selectively combining said first video signal and said compressed second video signal, whereby said special effects are produced.

2. The tracking system in accordance with claim 1, further including means for detecting minimum and maximum horizontal position signal values and minimum and maximum vertical position signal values.

3. The tracking system in accordance with claim 1, wherein said removing means includes gate means for gating said key signal by said frame signal.

* * * * *